(12) United States Patent
Ranieri

(10) Patent No.: US 11,175,136 B2
(45) Date of Patent: Nov. 16, 2021

(54) LASER LEVEL

(71) Applicant: STANLEY BLACK & DECKER INC., New Britain, CT (US)

(72) Inventor: Eric Ranieri, Besancon (FR)

(73) Assignee: Stanley Balck & Decker Inc., New Britain, CT (US)

(*) Notice: Subject to any disclaimer, the term of this patent is extended or adjusted under 35 U.S.C. 154(b) by 230 days.

(21) Appl. No.: 16/185,845

(22) Filed: Nov. 9, 2018

(65) Prior Publication Data

US 2019/0277633 A1   Sep. 12, 2019

Related U.S. Application Data

(60) Provisional application No. 62/640,655, filed on Mar. 9, 2018.

(51) Int. Cl.
*G01C 15/00* (2006.01)
*B25H 7/04* (2006.01)
*B25H 1/00* (2006.01)

(52) U.S. Cl.
CPC ......... *G01C 15/004* (2013.01); *B25H 1/0057* (2013.01); *B25H 7/04* (2013.01)

(58) Field of Classification Search
CPC .... G01C 15/004; G01C 15/002; G01C 15/06; G01C 15/105; G01C 1/00; G01C 1/02; G01C 9/24; G01C 9/28; B25H 7/04; B25H 1/0057
USPC ......................................................... 33/290
See application file for complete search history.

(56) References Cited

U.S. PATENT DOCUMENTS

| | | | |
|---|---|---|---|
| 1,153,760 | A | 9/1915 | Butler |
| 3,897,637 | A | 8/1975 | Genbo |
| 4,208,802 | A | 6/1980 | Bemdt |
| 4,228,982 | A | 10/1980 | Sellers |
| 4,425,065 | A | 1/1984 | Sweeney |
| 5,531,031 | A | 7/1996 | Green |
| 5,561,911 | A | 10/1996 | Martin |
| 5,713,135 | A | 2/1998 | Acopulos |
| 5,894,675 | A | 4/1999 | Cericola |
| 6,182,938 | B1 | 2/2001 | Wright |
| 6,230,416 | B1 | 5/2001 | Trigilio |
| 6,351,890 | B1 | 3/2002 | Williams |
| D460,924 | S | 7/2002 | Hitchcock |
| 6,449,855 | B1 | 9/2002 | Louis |

(Continued)

FOREIGN PATENT DOCUMENTS

| | | | |
|---|---|---|---|
| EP | 1473541 | 11/2004 | |
| EP | EP-1473541 A2 * | 11/2004 | ........... G01C 15/004 |
| JP | 2005265425 | 9/2005 | |

OTHER PUBLICATIONS

EP EESR dated Aug. 6, 2019 in corresponding EP application 19160354.7.

*Primary Examiner* — Yaritza Guadalupe-McCall
(74) *Attorney, Agent, or Firm* — Stephen R. Valancius

(57) ABSTRACT

A construction laser includes a base. The base includes a flat bottom surface that can be disposed on a work surface. There is a laser projector secured to the base. The laser projector includes a laser generator. The laser projector projects a laser beam onto the work surface when the flat bottom surface is disposed on the work surface. The construction laser also includes a pin. The pin secured to the base and being pivotable about an axis relative to the base.

12 Claims, 9 Drawing Sheets

(56) References Cited

U.S. PATENT DOCUMENTS

| | | | |
|---|---|---|---|
| 6,532,675 B2 | 3/2003 | Letourneau | |
| 6,625,895 B2 | 9/2003 | Tacklind et al. | |
| 6,643,019 B1 | 11/2003 | Jeanneret | |
| 6,735,879 B2 | 5/2004 | Malard et al. | |
| 6,754,969 B2 * | 6/2004 | Waibel | G01C 15/004 33/281 |
| 6,839,974 B1 | 1/2005 | Hitchcock | |
| 6,864,799 B2 | 3/2005 | Popps et al. | |
| 6,880,256 B2 * | 4/2005 | Helms | G01S 7/4026 33/286 |
| 6,931,740 B2 * | 8/2005 | Marshall | G01C 15/004 248/222.52 |
| 6,941,665 B1 * | 9/2005 | Budrow | G01C 15/008 33/286 |
| 7,013,570 B2 | 3/2006 | Levine et al. | |
| 7,055,252 B2 * | 6/2006 | Wu | G01C 15/00 33/286 |
| 7,213,342 B2 | 5/2007 | Khubani | |
| 7,237,341 B2 | 7/2007 | Murray | |
| 7,243,433 B2 | 7/2007 | Wu | |
| 7,269,907 B2 | 9/2007 | Levine et al. | |
| 7,278,218 B2 * | 10/2007 | Levine | G01B 11/26 248/183.2 |
| 7,367,129 B2 | 5/2008 | Lu | |
| 7,380,759 B1 | 6/2008 | Whiteside et al. | |
| 7,446,650 B2 | 11/2008 | Scholfield et al. | |
| 7,487,596 B2 | 2/2009 | Nash | |
| 7,497,019 B2 | 3/2009 | Nash et al. | |
| 7,748,126 B2 | 7/2010 | Lu | |
| 7,845,083 B1 | 12/2010 | Cora Rosa | |
| 7,886,450 B1 * | 2/2011 | Fiano | G01C 15/105 33/286 |
| 8,519,861 B2 | 8/2013 | Sergyeyenko et al. | |
| 8,966,776 B2 | 3/2015 | Kelly | |
| 10,119,817 B2 * | 11/2018 | Spaulding | G01C 15/004 |
| 2001/0049879 A1 | 12/2001 | Moore, Jr. | |
| 2002/0178596 A1 | 12/2002 | Malard et al. | |
| 2004/0123472 A1 * | 7/2004 | Wu | G01C 15/00 33/286 |
| 2004/0216313 A1 * | 11/2004 | Marshall | G01C 15/008 33/286 |
| 2005/0022399 A1 | 2/2005 | Wheeler et al. | |
| 2005/0066533 A1 | 3/2005 | Wheeler et al. | |
| 2005/0155238 A1 * | 7/2005 | Levine | G01C 15/004 33/286 |
| 2005/0198845 A1 * | 9/2005 | Robinson | G01C 15/004 33/227 |
| 2005/0278966 A1 | 12/2005 | Liu | |
| 2006/0185181 A1 * | 8/2006 | Long | G01C 15/002 33/286 |
| 2007/0283584 A1 * | 12/2007 | Harari | G01C 15/008 33/290 |
| 2010/0122466 A1 | 5/2010 | Hemingway et al. | |
| 2017/0303709 A1 | 10/2017 | Ulloa et al. | |
| 2019/0277633 A1 * | 9/2019 | Ranieri | B25H 7/04 |

* cited by examiner

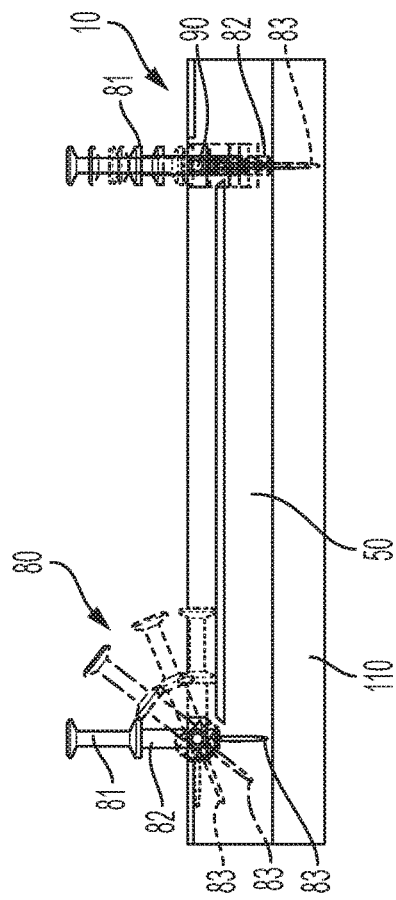
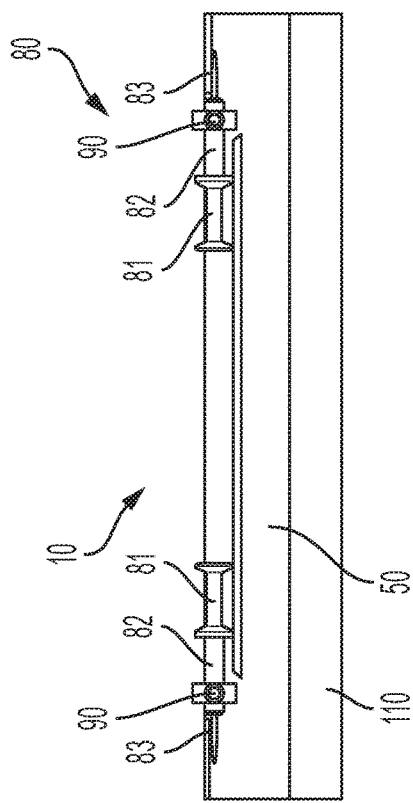

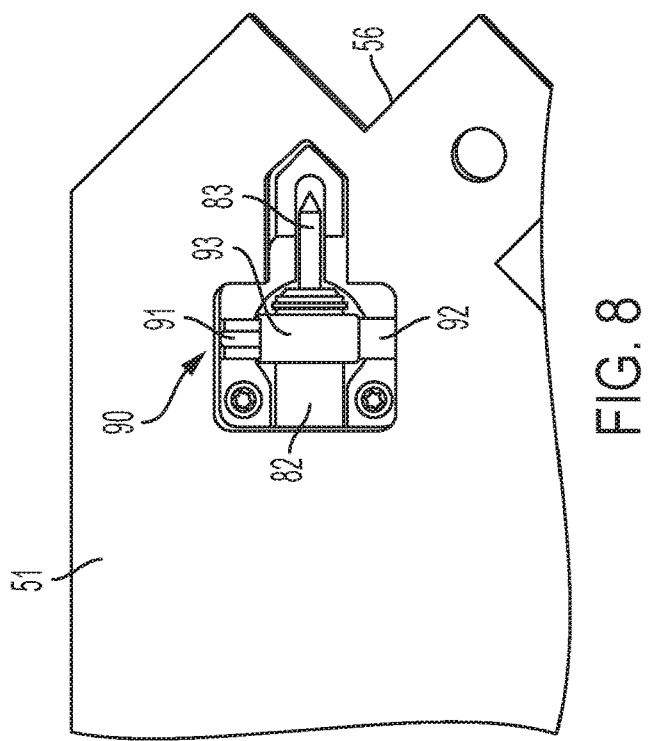
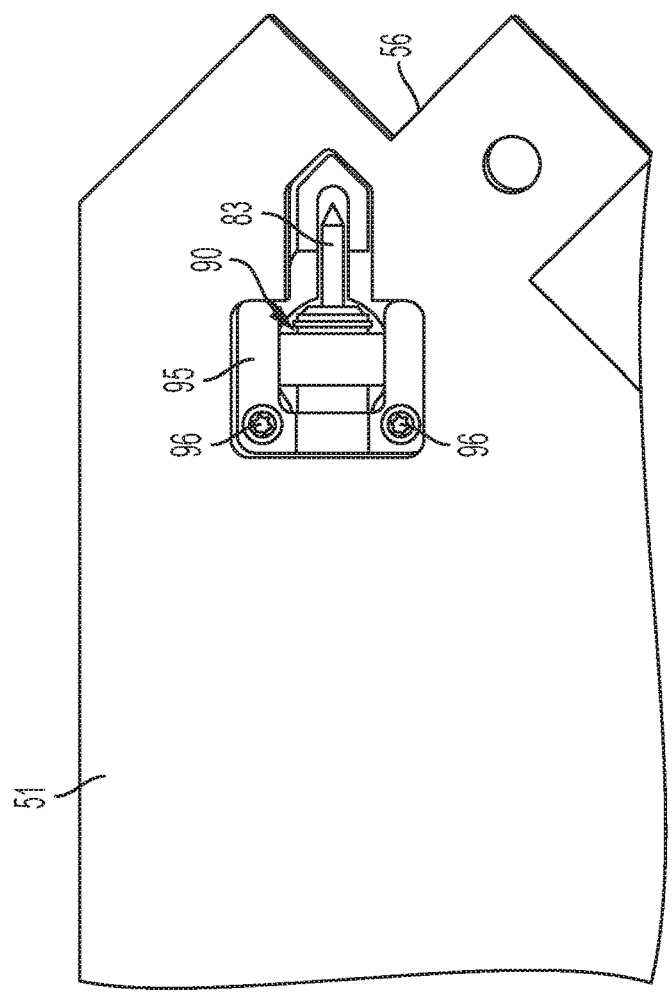

LASER LEVEL

CROSS-REFERENCE TO RELATED APPLICATION

This application claims the benefit of U.S. Provisional Application No. 62/640,655 filed on Mar. 9, 2018, entitled Laser Level Pendulum Arrest. The entire contents of U.S. Provisional Application No. 62/640,655 are incorporated herein by reference.

FIELD OF THE INVENTION

The present invention relates to construction lasers, particularly construction lasers with pins for securing the construction laser to a surface.

BACKGROUND

There are various existing construction lasers. It is desired to provide a laser level with an improved structure for securing the construction laser to a surface.

SUMMARY

According to an exemplary embodiment, there is a construction laser. The construction laser includes a base, the base including a flat bottom surface configured to be disposed on a work surface. A laser projector is secured to the base, the laser projector comprising a laser generator, and the laser projector projecting a laser beam onto the work surface when the flat bottom surface is disposed on the work surface. The construction laser further includes a pin, the pin secured to the base and being pivotable about an axis relative to the base.

The pin may be pivotable from a secured position to a actuatable position.

In the actuatable position, the pin may be translatable into the work surface.

The pin may include a projection portion.

The pin may be movable from a position where the projection portion is separated from the work surface to an extended position in which the projection portion extends into the work surface.

The construction laser may further include a battery compartment configured to receive a battery.

The pin may be pivotable through a range of at least 45 degrees.

The pin may be pivotable through a range of at least 85 degrees.

The construction laser may further include a pivot.

The pivot may hold the pin and allow to pivot.

The pivot may include an opening.

A portion of the pin may be slidably disposed in the opening.

The opening may be cylindrical.

According to another aspect, there is a construction laser including a base. The base includes a bottom surface configured to be disposed on a work surface. A laser projector is secured to the base. The laser projector includes a laser generator, and projects a laser beam onto the work surface when the bottom surface is disposed on the work surface. The construction laser further includes pair of pins. The pins are secured to the base and are pivotable about an axis relative to the base.

The pins may be pivotable from a secured position to a actuatable position.

In the actuatable position, the pins may be translatable into the work surface.

The pins may include a projection portion.

The pins may be movable from a position where the projection portion is separated from the work surface to an extended position in which the projection portion extends into the work surface.

The pins may be pivotable through a range of at least 45 degrees.

The pins may be pivotable through a range of at least 85 degrees.

The construction laser may further include a pair of pivots, the pivots holding the pins and allowing the pins to pivot.

The pivots may include a cylindrical opening.

Each pivot may slidably receive one of the pair of pins in the cylindrical opening.

According to another aspect, there is a method of securing a construction laser to a work surface. The method includes providing a construction laser, the construction laser including a base with a reference surface; the construction laser further comprising a laser projector secured to the base, the laser projector comprising a laser generator and configured to project a laser beam; the construction laser further comprising a pin secured to the base. The method further includes, placing the reference surface on the work surface; rotating the pin relative to the base; and translating the pin towards the work surface so that a portion of the pin penetrates the work surface.

The method may further include turning on the laser generator so that it generates the laser beam.

The method may further include the laser beam projecting onto the work surface.

The construction laser further include a second pin secured to the base, and the method may further include rotating the second pin relative to the base; and translating the second pin towards the work surface so that a portion of the second pin penetrates the work surface.

BRIEF DESCRIPTION OF THE DRAWINGS

FIG. 6A is a cross-sectional explanatory view of the construction laser with pins in a stored position;

FIG. 6B is a cross-sectional explanatory view of the construction laser with pins moving from a stored position, to an actuating position and a securing position;

FIG. 7 is a close-up, bottom view of a portion the construction laser;

FIG. 8 is a close-up, bottom view of a portion the construction laser;

DETAILED DESCRIPTION OF EXEMPLARY EMBODIMENTS

Figure 1:
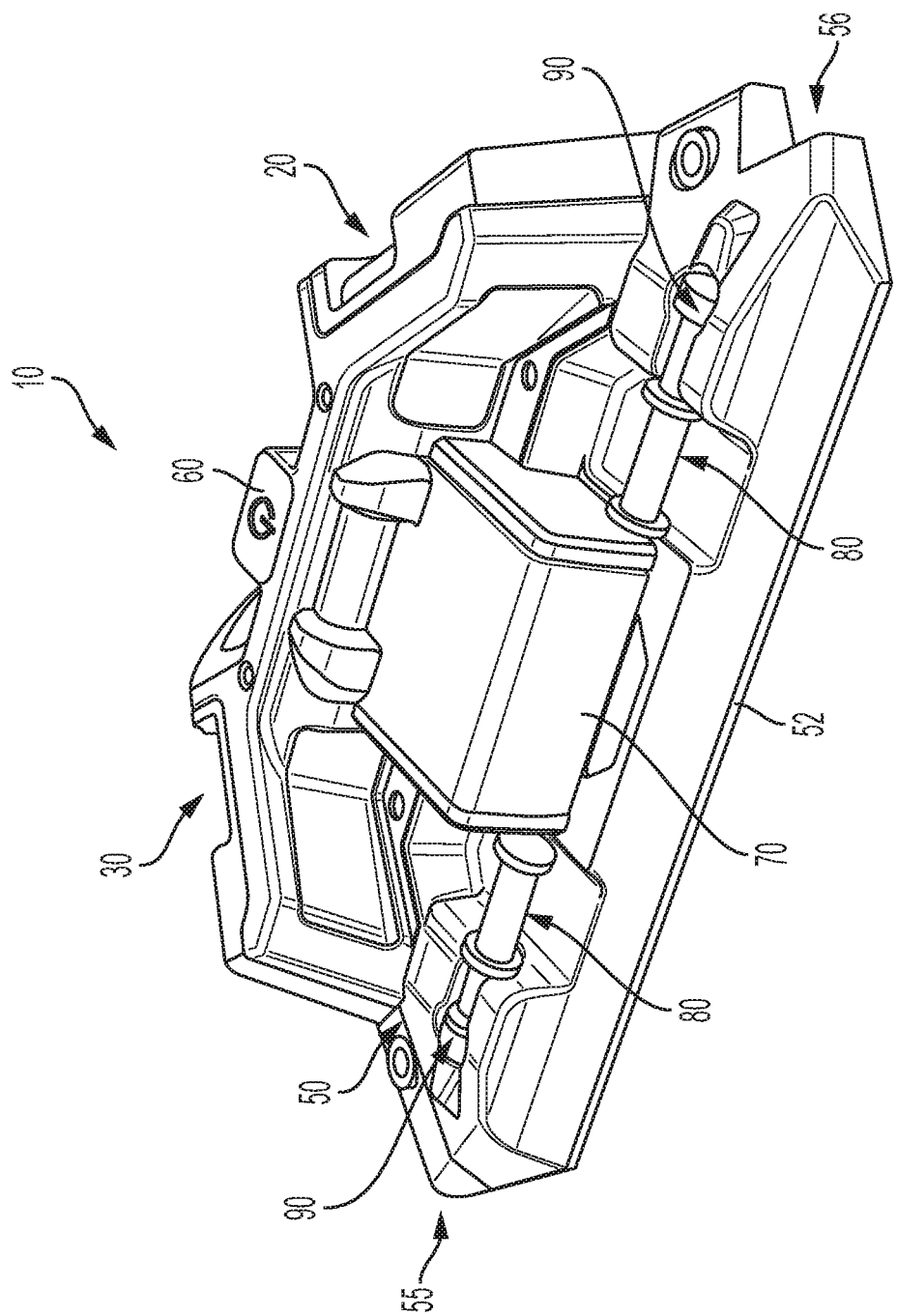
FIG. 1 illustrates a perspective view of an exemplary embodiment of a construction laser.
Figure 2:
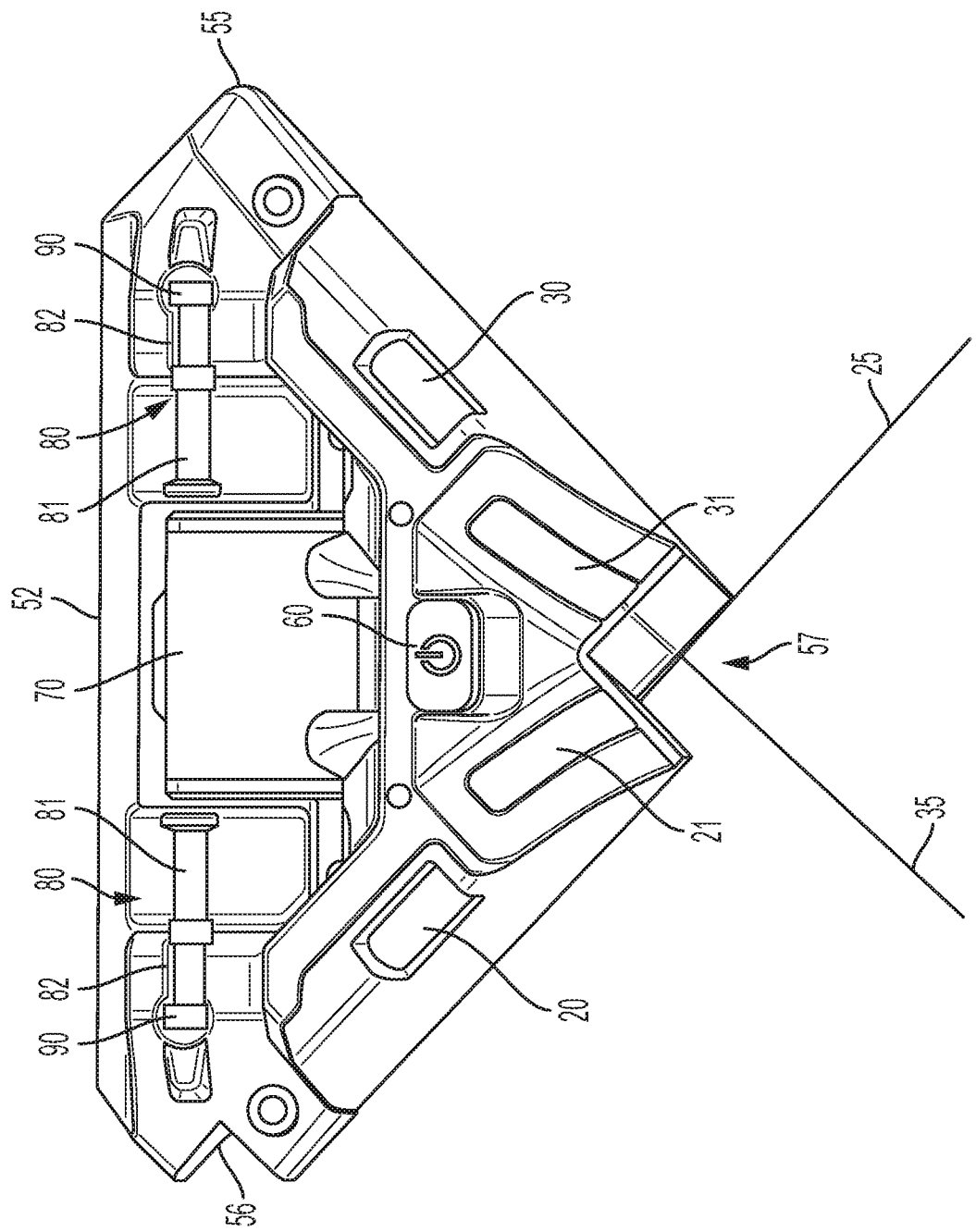
FIG. 2 is a top view of the exemplary embodiment of the construction laser.
Figure 3:
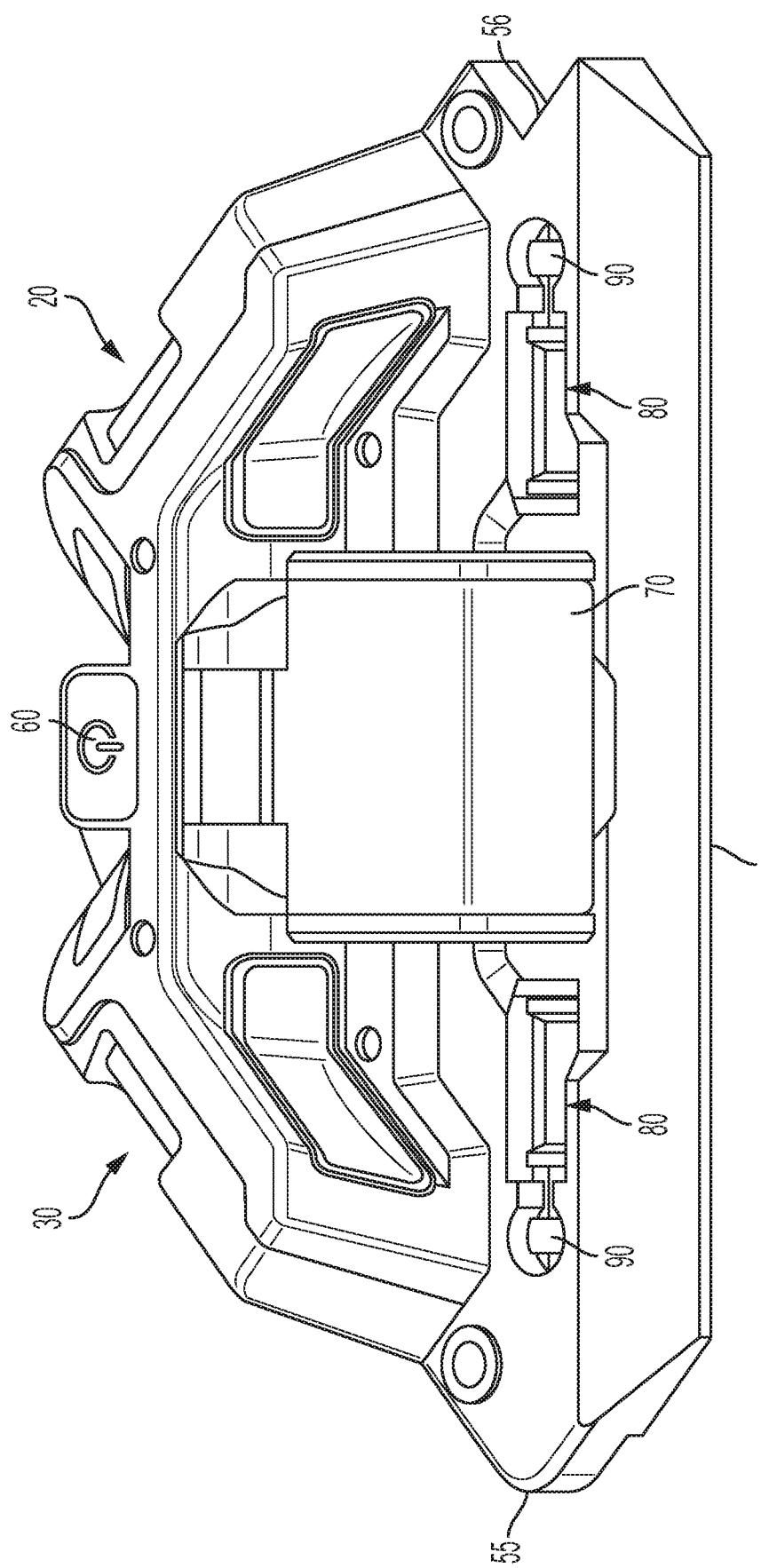
FIG. 3 is a top perspective view of the exemplary embodiment of the construction laser.
Figure 4:
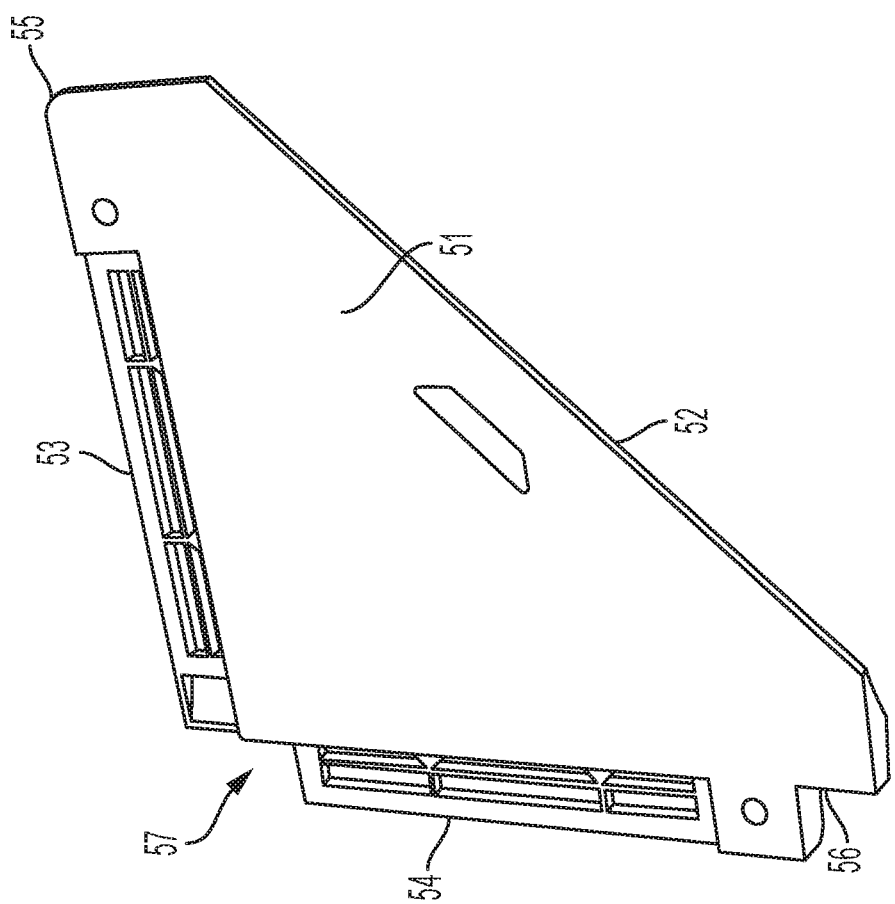
FIG. 4 is a bottom view of the exemplary embodiment of the construction laser.
Figure 5:
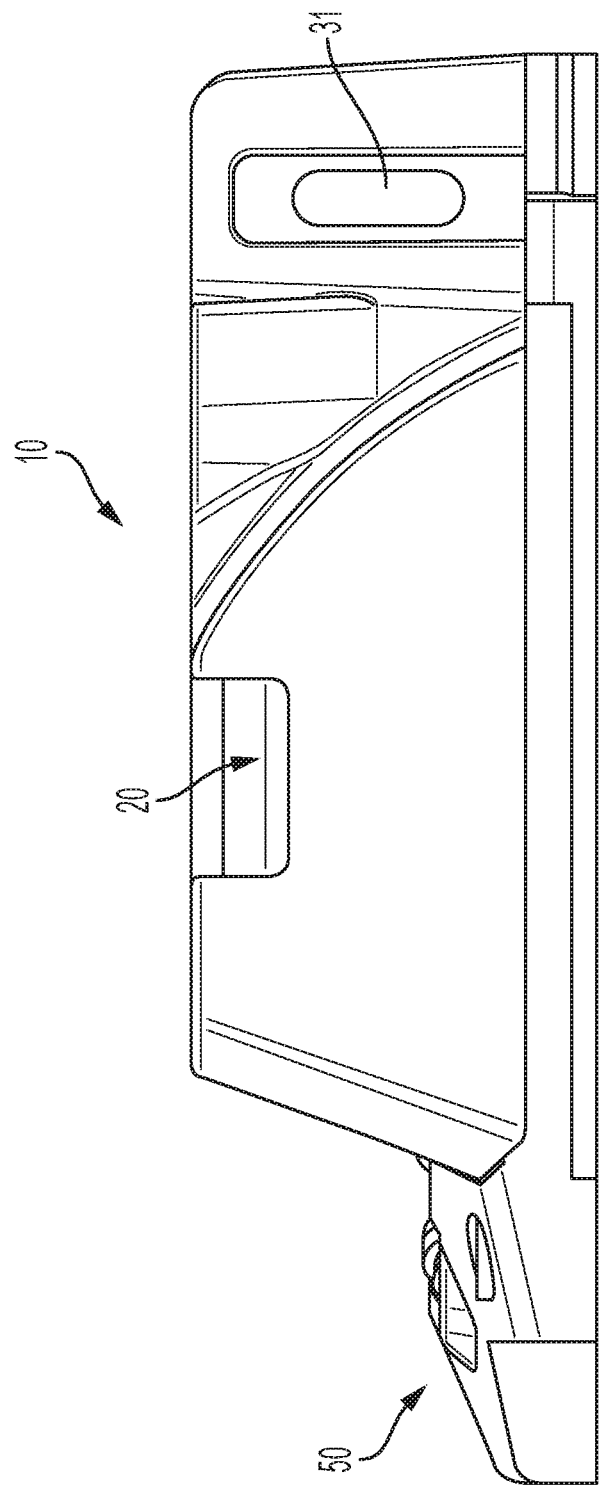
FIG. 5 is a side view of the exemplary embodiment of the construction laser.

An exemplary embodiment of a construction laser 10 is shown in FIGS. 1-10. The construction laser 10 of the exemplary embodiment is a tile laser. The tile laser 10 has a base 50. The base 50 has a substantially triangular shape. A bottom surface 51 of the base 50 is shown in FIG. 4. The bottom surface 51 similarly has a substantially triangular shape.

As shown in FIGS. 1-4, the base 50 includes a front surface 52 and side surfaces 53 and 54. The front surface 52 provides a straight edge, which can be used to draw a straight line. The front surface 52 may also be placed against a flat surface, such as a wall, floor or ceiling, and thus help position the construction laser 10. The side surfaces 53 and 54 may similarly provide a straight edge for drawing lines or positioning the construction laser 10.

The construction laser 10 further includes corners 55, 56 and 57. Corner 55 includes a 90 degree angle so that it fits into a 90 degree corner, such as that provided by two interior perpendicular walls. Corner 56 provides a 90 degree cut-out. The 90 degree cut-out allows the corner 56 to be positioned around a 90 degree projection. For example, the outside corner of a building with perpendicular walls. The corner 57 provides a 90 degree cut-out and a sloping surface 58. All three of the corners 55, 56 and 57 may be used to accurately position the construction laser 10.

The laser 10 further includes a pair of laser projectors 20, 30. The first laser projector 20, projects a laser beam out of a window 21. The laser beam projected out of window 21 projects a line 25 onto a surface on which the bottom surface 51 of the laser 10 is sitting. The line 25 may be aligned with the window and parallel to the side surface 54. The second laser projector 30, projects a laser beam out of a window 31. The laser beam projected out of window 31 projects a line 35 onto a surface on which the bottom surface 51 of the laser 10 is sitting. The line 35 may be aligned with the window and parallel to the side surface 53. Lines 25 and 35 are perpendicular to one another.

Figure 10:
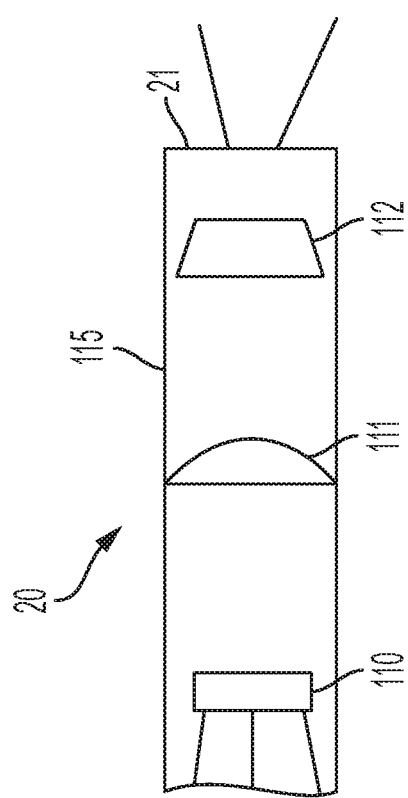
FIG. 10 schematic of a laser projector of the construction laser.

FIG. 10 illustrates laser projector 20 diagrammatically. Laser projector 30 has the same structure as laser projector 20. As shown in FIG. 10, there is a laser generator 110. The laser generator 110 may be a laser diode. The laser generator 110 produces a laser beam which passes through a collimator lens 111. The beam then passes through a prism 112 that fans out the beam so that it produces line 25, shown in FIG. 2. These parts, and the window 21, may be held in place by a cylindrical tube 115. The laser generator 110 is powered by the one or more batteries stored in the battery compartment 70, described below.

As shown in FIGS. 1-4, there is a power button 60 for actuating the laser projectors 20, 30. The power button 60 may be configured to turn on the laser projectors 20, 30 simultaneously, or one at a time. For example, pushing the power button 60 a first time may actuate the first laser projector 20. Actuating the power button 60 a second time may actuate the second laser projector 30 and turn off the first laser projector 20. Actuating the power button 60 a third time may turn on both the first laser projector 20 and the third laser projector 30 at the same time. Finally, actuating the power button 60 a fourth time may turn both of the laser projectors 20, 30 back off. Of course, various other arrangements or systems may be used. For example, the power button 60 may simply turn both of the laser projectors 20, 30 on and off at the same time. There may also be more than one button or other methods of actuating the laser projectors 20, 30. As will be appreciated, the laser projectors 20, 30 are turned on by providing power to the laser generator 110 mentioned above.

The tile laser 10 also includes a battery compartment 70. The battery compartment houses one or more batteries for powering the laser projectors 20, 30. The batteries may be removable alkaline batteries. The batteries may also be of different cell chemistries or types. For examples, a rechargeable lithium ion battery pack may be used, such as one compatible with a power tool system.

The tile laser 10 also includes a pair of pins 80. The pins 80 are used to secure the tile laser 10 to a surface. Operation of the pins is best shown in FIGS. 6A and 6B. The tile laser 10 is shown schematically in FIGS. 6A and 6B. As shown in FIGS. 6A and 6B, the base 50 of the tile saw 10 is placed on a surface 110. The surface 110 may be a sheet rock, concrete board, drywall or other work surface. A user of the tile laser 10 may wish that the tile laser 10 be secured in place, so that it does not move and the lines 25, 35 also remain in place.

FIG. 6A shows the pins 80 in a stored position. FIG. 6B illustrates one pin 80 (left side of FIG. 6B) in various states transitioning from a stored to vertical position and a second pin 80 in shadow from the vertical position to a secured position. When the pins 80 are in the vertical position, they are in an actuation position where they can be actuated to project into the surface 110 by being pressed towards the surface 110. In the illustrated embodiment, there is no biasing member, such as a spring. In other embodiments, there may be a biasing member, such as a spring, which biases the pin 80 towards the vertical/actuation position or towards the secured position. There may also be a biasing member which biases the pins 80 either towards the stored position or towards the actuation/vertical position. There may also be detents to secure the pins 80 in the stored position and additional detents to secure the pins 80 in the actuation/vertical position.

As shown in FIGS. 6A and 6B, the pins 80 have a handling portion 81, and middle portion 82 and a projection portion 83. The pins 80 rotate around a pivot 90. As shown in FIG. 6A, the pins 80 can be in a stored position. When in the stored position, the pins 80 are substantially parallel to the surface 110. The pins 80 are shown in the stored position in FIGS. 1-3.

On the left side of FIG. 6B, a pin 80 is shown in various different positions from the stored position to a vertical position. In the vertical position, the pin is in position to be pushed into the surface 110, but does not penetrate the surface. On the right side of FIG. 6B, the pin is shown in an inserted position, in which the pin 80 is pushed into the surface 110. Specifically, the projection portion 83 of the pin 80 is pushed into the surface 110.

Figure 9:
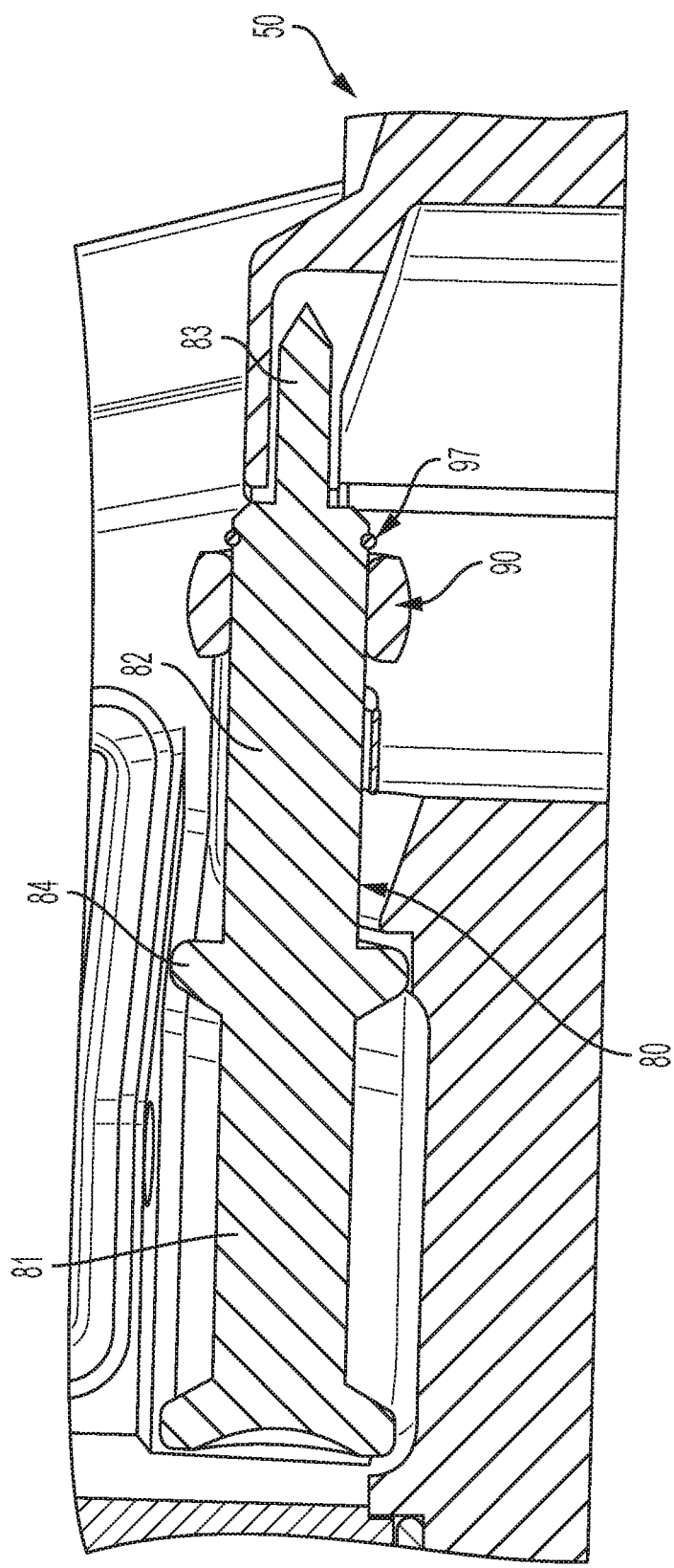
FIG. 9 is close-up cross-sectional view of a pin and pivot of the construction laser.

FIGS. 7-9 illustrate a pin 80 in more detail. Both of the pins 80 in the tile laser 10 are the same. FIGS. 7 and 8 are bottom view of the tile laser 10. FIG. 7 is a close-up view of the pin 80 and pivot 90 held in by pivot retainer 95. FIG. 8 is a close-up view of the pin 80 and pivot 90 with the retainer 95 removed. FIG. 9 is a bottom cross-sectional close-up view of the pin.

The pivot 90 is best seen in FIG. 8. As shown in FIG. 8, the pivot 90 has a central portion 93 and two projections 91 and 92. The central portion is circular and has a circular opening, through which the pin 80, specifically the middle portion 82 of the pin 80, is slidably received. The two projections 91 and 92 are fit into receiving portions of the tile laser base 50. The projections 91, 92 serve as a pivot axis about which the pin 80 can rotate. As shown in FIG. 7, the pivot retainer 95 is secures the pivot 90 to the tile laser base 50. The pivot retainer 95 is fastened to the base 50 by a pair of fasteners 96.

FIG. 9 shows a cross-sectional view of the pin 80 and pivot 90. As shown in FIG. 9, the middle portion 82 of the pin 80 is received in the central portion 93 of the pivot 90.

The pin 80 is shown in the stored position in FIG. 9. As will be appreciated, sliding movement of the pin 80 is restrained at one end by an O-ring 97 and at the other end by a shoulder 84 of the handling portion 81. That is, when in the vertical position, the pin 80 can be retracted upward, away from the surface 110, until the O-ring 97 contacts the pivot 90 (specifically the central portion 93 of the pivot). The pin 80 is restrained when being pushed from the upward vertical position to an inserted position by contact of the shoulder 84 and the pivot 90 (again, the central portion 93 of the pivot). Thus, the shoulder 84 and the O-ring 97 limit the translation of the pin 80 in the pivot 90. This keeps the pin 80 from being pushed too far into the surface 110 or retracted too far. Additionally, it secures the pin 80 in the pivot 90, and thus, the tile laser 10. As shown in the various FIGS., the pins 80 are additionally restrained by other portions of the tile laser 10 when in the secured position. For example, as shown in FIGS. 7 and 8, the pin 80 can not be extended significantly when in the stored position without hitting a housing portion.

As shown in, for example, FIGS. 6-9, the projection portion 83 of the pins 80 is tapered to a point. This allows it to penetrate into the surface 110. The projection portion 83 may be made of metal in order to facilitate insertion into the surface 110. The projection portion 83 is also made thinner than the middle portion 82 and handling portion 81 of the pin 80, so as to both facilitate insertion into the surface 110 and provide minimum visual or structural impact on the surface 110 when it is inserted into the surface 110. In other embodiments, the projection 83 may also be made of other hard materials that can penetrate a surface, for example a hard plastic.

The pins 80 are rotatable approximately 90 degrees in the exemplary embodiment. In various embodiments, the pins may be rotatable at least 45 degrees or at least 85 degrees.

While shown and described with respect to a tile laser, the pins 80 may be used on other types of construction lasers to secure the construction lasers to a surface or in a particular orientation. For example, the pins 80 may be used to secure a cross-line laser level or rotary laser level to a surface.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A construction laser, comprising:
a base, the base including a flat bottom surface configured to be disposed on a work surface;
a laser projector secured to the base, the laser projector comprising a laser generator, and the laser projector projecting a laser beam onto the work surface when the flat bottom surface is disposed on the work surface; and
a pin, the pin secured to the base and being pivotable about an axis relative to the base;
wherein the pin is translatable relative to the base; and
wherein the pin is pivotable through a range of at least 45 degrees.

2. The construction laser of claim 1, wherein the pin is pivotable from a secured position to an actuatable position; and
wherein in the actuatable position, the pin is translatable into the work surface.

3. The construction laser of claim 1, wherein the pin includes a projection portion;
wherein the pin is movable from a position where the projection portion is separated from the work surface to an extended position in which the projection portion extends into the work surface.

4. The construction laser of claim 1, further comprising a battery compartment configured to receive a battery.

5. The construction laser of claim 1, wherein the pin is pivotable through a range of at least 85 degrees.

6. A construction laser, comprising:
a base, the base including a flat bottom surface configured to be disposed on a work surface;
a laser projector secured to the base, the laser projector comprising a laser generator, and the laser projector projecting a laser beam onto the work surface when the flat bottom surface is disposed on the work surface;
a pin, the pin secured to the base and being pivotable about an axis relative to the base;
wherein the pin is also translatable relative to the base; and
further comprising a pivot, the pivot holding the pin and allowing the pin to pivot.

7. The construction laser of claim 6, wherein the pivot comprises an opening; and
wherein a portion of the pin is slidably disposed in the opening.

8. The construction laser of claim 7, wherein the opening is cylindrical.

9. A construction laser, comprising:
a base, the base including a bottom surface configured to be disposed on a work surface;
a laser projector secured to the base, the laser projector comprising a laser generator, and the laser projector projecting a laser beam onto the work surface when the bottom surface is disposed on the work surface;
a pair of pins, the pins secured to the base and being pivotable about an axis relative to the base;
wherein the pins are pivotable from a secured position to an actuatable position;
wherein in the actuatable position, the pins are translatable relative to the base into the work surface;
wherein the pins include a projection portion;
wherein the pins are movable from a position where the projection portion is separated from the work surface to an extended position in which the projection portion extends into the work surface; and
wherein the pins are pivotable through a range of at least 45 degrees.

10. The construction laser of claim 9, wherein the pins are pivotable through a range of at least 85 degrees.

11. A construction laser, comprising:
a base, the base including a bottom surface configured to be disposed on a work surface;
a laser projector secured to the base, the laser projector comprising a laser generator, and the laser projector projecting a laser beam onto the work surface when the bottom surface is disposed on the work surface;
a pair of pins, the pins secured to the base and being pivotable about an axis relative to the base;
wherein the pins are pivotable from a secured position to an actuatable position;
wherein in the actuatable position, the pins are translatable relative to the base into the work surface;
wherein the pins include a projection portion; and
wherein the pins are movable from a position where the projection portion is separated from the work surface to an extended position in which the projection portion extends into the work surface;

further comprising a pair of pivots, the pivots holding the pins and allowing the pins to pivot.

12. The construction laser of claim 11, wherein the pivots each include a cylindrical opening; each pivot slidably receiving one of the pair of pins in the cylindrical opening.

\* \* \* \* \*